United States Patent
Kennedy

[11] Patent Number: 5,971,208
[45] Date of Patent: Oct. 26, 1999

[54] SMART SCENT DISPENSER

[76] Inventor: Gene Kennedy, c/o Fiberglass Technologies, 1609-P Harmer St., Levittown, Pa. 19057

[21] Appl. No.: 09/096,779

[22] Filed: Jun. 12, 1998

[51] Int. Cl.$^6$ .................................................. A01M 31/00
[52] U.S. Cl. .......................... 222/54; 222/152; 222/181.1; 222/214; 222/420; 43/1; 119/73
[58] Field of Search ................................. 222/180, 181.1, 222/54, 152, 209, 214, 420; 43/1, 2; 119/72, 72.5, 73

[56]  References Cited

U.S. PATENT DOCUMENTS

| 3,734,348 | 5/1973 | White | 222/1 |
|---|---|---|---|
| 4,634,021 | 1/1987 | Davis | 222/54 |
| 5,029,731 | 7/1991 | Klatt | 222/54 |
| 5,148,949 | 9/1992 | Luca | 43/1 |
| 5,220,741 | 6/1993 | Burgeson | 43/1 |
| 5,279,062 | 1/1994 | Burgeson | 43/1 |
| 5,361,527 | 11/1994 | Burgeson | 43/1 |

Primary Examiner—J. Casimer Jacyna
Attorney, Agent, or Firm—Daniel E. Kramer

[57] ABSTRACT

A device and method for delivering an animal attractant scented liquid to a spot on the ground. The device is intended to be positioned on the ground. It employs a flexible walled container with an external gas filled balloon strapped to the container so positioned that expansion and contraction of the gas within the balloon, in response to temperature changes, causes the wall of the container to flex so as to discharge liquid from the container when the temperature rises, and cease discharging on a temperature drop.

20 Claims, 4 Drawing Sheets

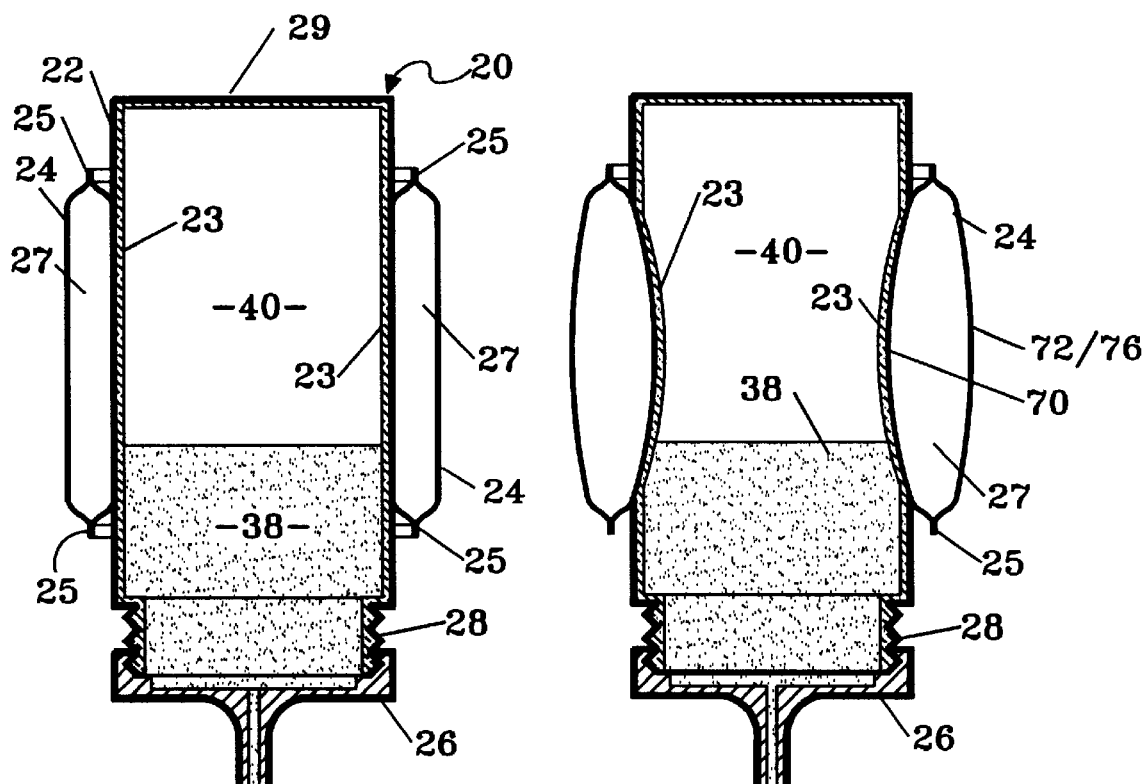
*Fig.2A*
SECTION A:A
*Fig.2B*
SECTION A:A
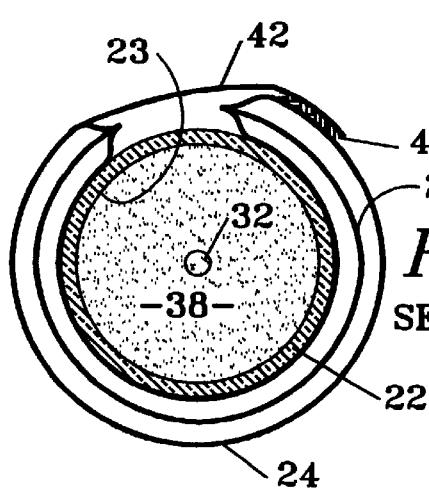
*Fig.2C*
*Fig.3*
SECTION B:B
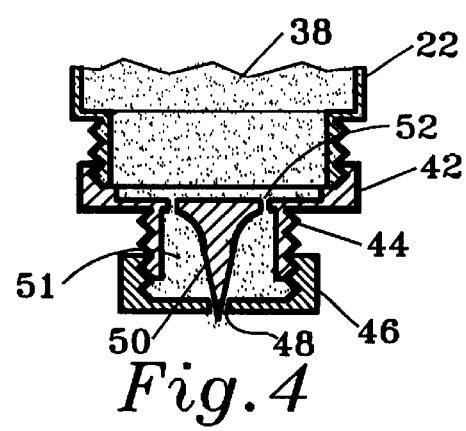
*Fig.4*

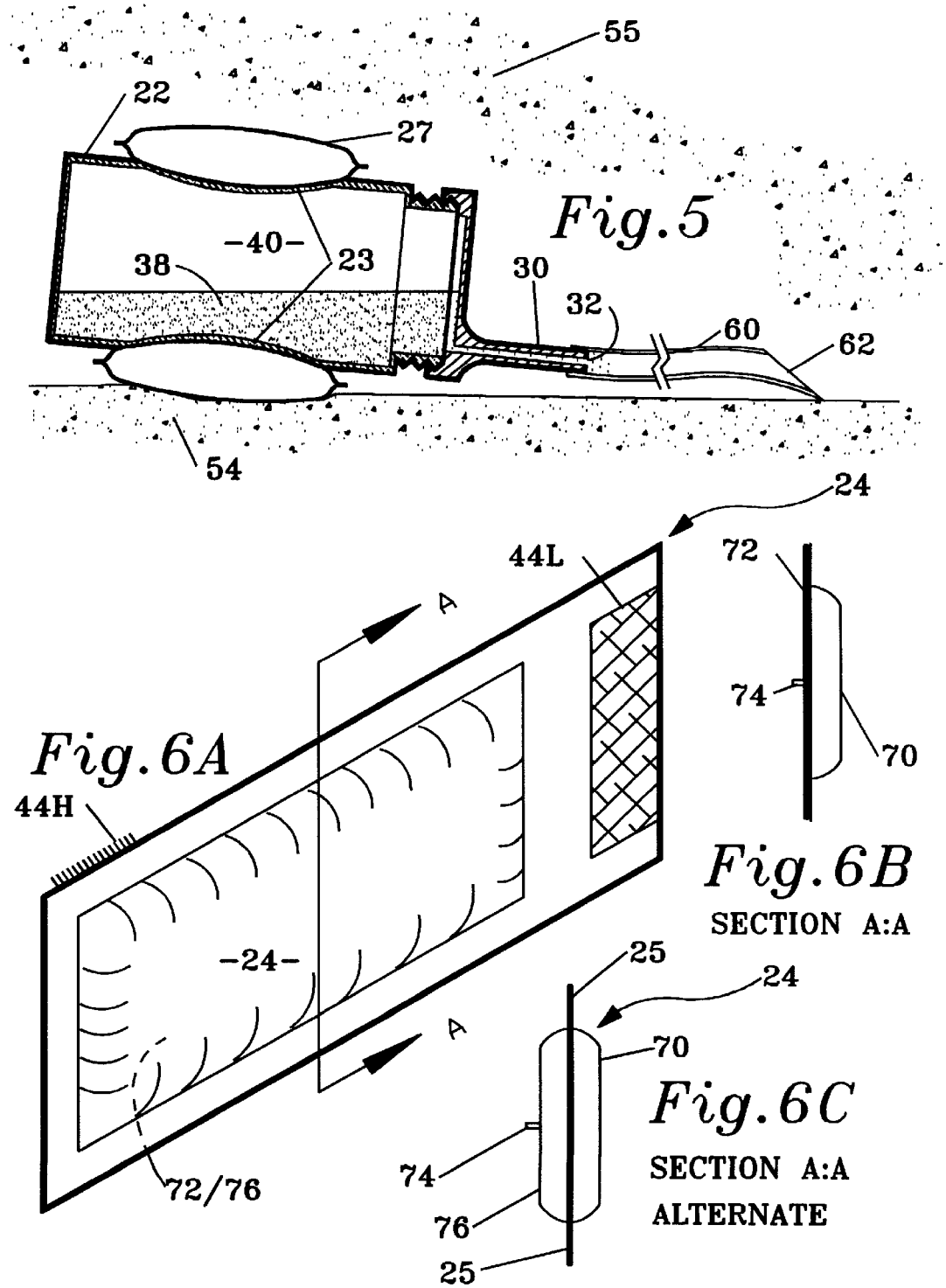

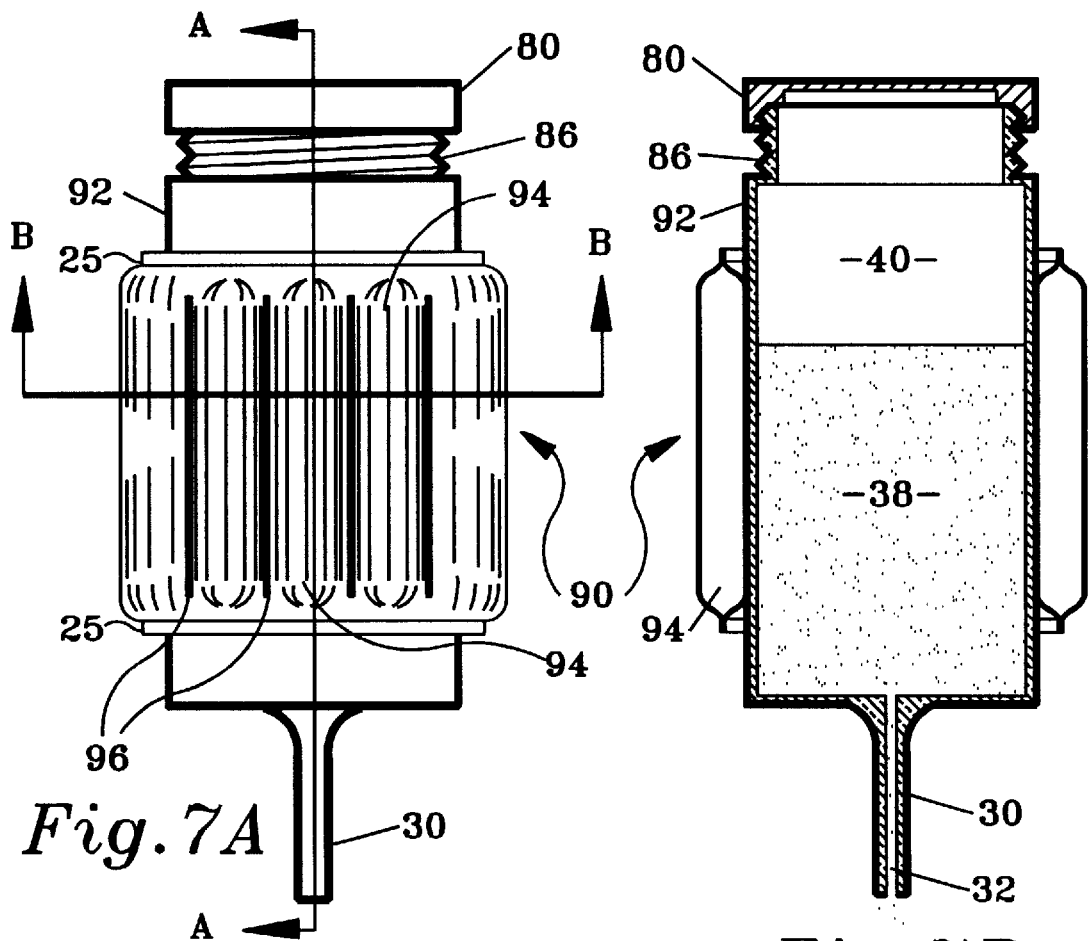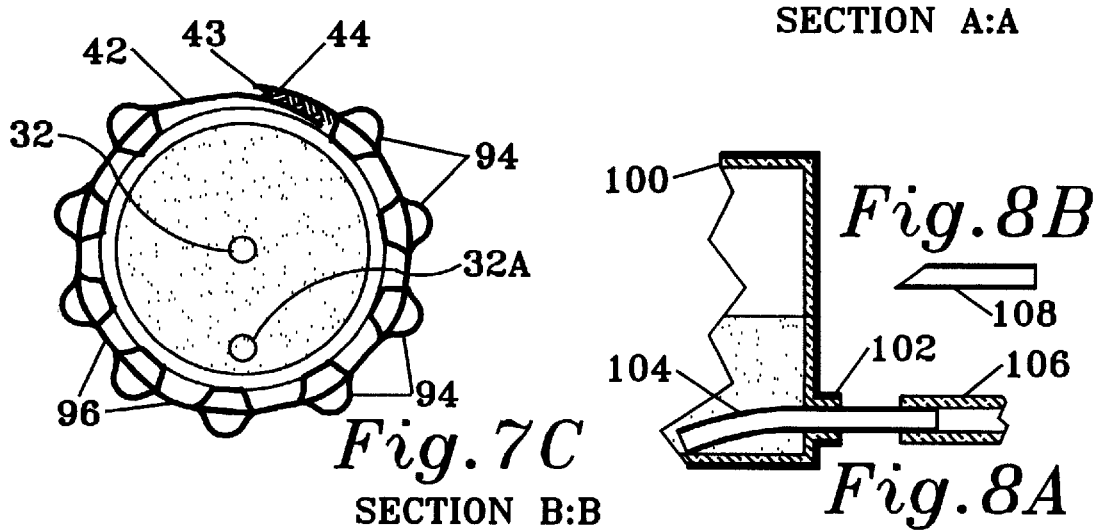

SMART SCENT DISPENSER

FIELD OF THE INVENTION:

The invention is directed to a device and method for delivering an animal attractant scented liquid to a spot on the ground.

BACKGROUND

During the mating season, and even at other times, male animals such as deer, attempt to attract females for mating by scraping the ground at desirable locations and urinating upon the scrape to provide a scent which is likely to attract females. The females in turn, when attracted to these spots, also leave a special female scent which is highly attractant to males. Chemists and others have developed both artificial and natural scents which substantially duplicate the female mating scent. Liquids bearing these scents are offered for sale in small quantities and at high cost.

Hunters and others who wish to examine such animals at close range have manually dripped such scents on the ground. In some cases they prepare the ground by scraping an area to simulate a deer "scrape" before dripping the scented liquid on the scrape. However, human trespass can disturb the critical area in ways known only to animals. Sometimes these disturbances provide persistent unseen warnings which tend to keep the desired animal from approaching.

Therefore, devices have been developed to continuously or periodically deliver portions of scented liquid to the desired spot without human attendance. Continuous delivery of the liquid is wasteful, since nighttime delivery is considered ineffective and therefore useless.

The following is a brief description of one prior art automatic delivery system. The present invention is deemed to provide a significant advantage over the prior system described below.

DISCUSSION OF PRIOR ART

Burgeson U.S. Pat. No. 5,279,062 teaches a method and Burgeson U.S. Pat. Nos. 5,361,527 and 5,220,741 teach apparatus for dispensing a scented liquid (scent) onto the ground. The device employs a rigid camouflaged scent container having a cap with a nozzle tube which may be straight or bent through 180 degrees into a J shape or through 360 degrees into a circular shape. The container is suspended over the ground and is partially filled with the scented liquid. As the air in the space over the liquid expands during the day it pushes out a volume of scented liquid.

Clearly, this invention suffers from the defect that the scent container can be only partly filled. Also it must be clear that the amount of liquid scent delivered depends on the unfilled volume within the container. When the container is more filled, the air volume remaining is less and less liquid scent is delivered for a given temperature change. Further, when the container is more filled, it has a large mass and must respond more slowly to any temperature change. By contrast, when the container is nearly empty, there is a large gas volume within the container which will cause a larger amount of liquid scent to be delivered for a given temperature change. Further, when the container is nearly empty, the small mass of liquid heats easily, thereby causing a widely varying rate and quantity of liquid scent to be delivered, depending on the fraction of the bottle which is filled.

Also, since the device must be suspended above the ground, there is substantial likelihood that the scent will be dissipated by evaporation or the wind after it is released from the tube but before it reaches the ground.

Further, any object hanging and swaying from a tree or stand, though camouflaged, is not only likely to alert and scare away animals of interest but may expose the device to theft or destruction by humans or deliberate human contamination of the area or competition by other hunters for the animal attracted.

Further, the most attractive scrape or hunting site may not be under a tree.

Further, the container must be made of some rigid material such as glass. Such a container is likely to be readily broken, should the container fall from the tree or support where it is suspended or in the case of rigid plastic, crack with exposure to sunlight or other environments.

OBJECTS AND ADVANTAGES OF THE PRESENT INVENTION

It is an object of the present invention to provide a device for dispensing scented liquid from a container on a positive temperature change and stopping the dispensing on a negative temperature change.

It is a further object to provide such a device which responds to ambient temperature change and delivers such scented liquid upon a rise in ambient temperature and stops delivery on a fall in temperature.

The invention is further directed to such a device which employs a soft flexible and unbreakable container for holding and dispensing the scent.

The invention is further directed to a device whose function does not depend on the expansion of air within the container.

The invention is further directed to a device which delivers a substantially constant amount of scented liquid for a given temperature change, regardless of the quantity of scented liquid within the container, or the fraction of the container filled.

The invention is further directed to a device which employs an external gas-filled flexible envelope or balloon positioned to fully or partially surround the scent container and to compress and deform the container, thereby ejecting scented liquid on a rise in ambient temperature and stopping ejection on a fall in temperature.

The invention is further directed to such a device which is intended to lay on the ground and be covered with earth or leaves, thereby providing the advantages of a highly effective natural camouflage and a motionless and hidden position, neither subject to scaring an animal or enticing theft or deliberate human contamination, while allowing the device to be subject to ambient temperature changes.

The invention is further directed to such a device whose rate of scented liquid delivery per unit temperature change is adjustable by the user in at least one of several ways.

The invention is further directed to a construction which can be used on all sites, whether or not under a tree.

Other characteristics and advantages will become apparent as the construction of the device is observed from the drawings and the functioning of the device is described in more detail in the ensuing description.

BRIEF DESCRIPTION OF THE DRAWINGS

FIGS. 2A, 2B and C are full or partial cross-sections of the structure of FIG. 1. FIG. 2A shows the container and balloon with the balloon partly inflated and the container not squeezed, as in a cool environment; FIG. 2B shows the structure of FIG. 1 with the balloon more fully inflated, as in a warmer environment, and with the container deformed by the balloon. FIG. 2C shows a simple means for adjusting the flow capability of the outflow channel 32.

FIG. 3 is a top cross-section of the structure of FIG. 1 showing how the substantially planar balloon of FIG. 6A, 6B and 6C is wrapped around the container and secured thereon.

FIG. 4 shows a cross-section of a cap having an adjustable delivery port.

FIG. 5 illustrates a cross-section of one form of the invention intended to be positioned on the ground.

FIG. 6A shows the construction of the balloon. FIG. 6B shows the balloon constructed with uniform layer thickness. FIG. 6C illustrates a balloon construction where the outer layer is thicker than the inner layer.

FIGS. 7A and 7C are side elevation views and top cross-section of a balloon having parallel adjacent tubular elements which are in gaseous communication, each with the other.

FIG. 7B shows a vertical cross-section of the structure of FIG. 7A in which the cap has no outlet and the outlet is positioned in the end of the container opposite the cap.

FIG. 8A shows the end of a container with the outlet offset and with an insert tube for delivery of the scent liquid.

FIG. 8B shows an insert tube of a strong rigid material, such as metal, having a chisel end to allow its forced penetration through the container wall at any point to allow flexible application of a container.

DETAILED DESCRIPTION OF THE INVENTION

Figure 1:
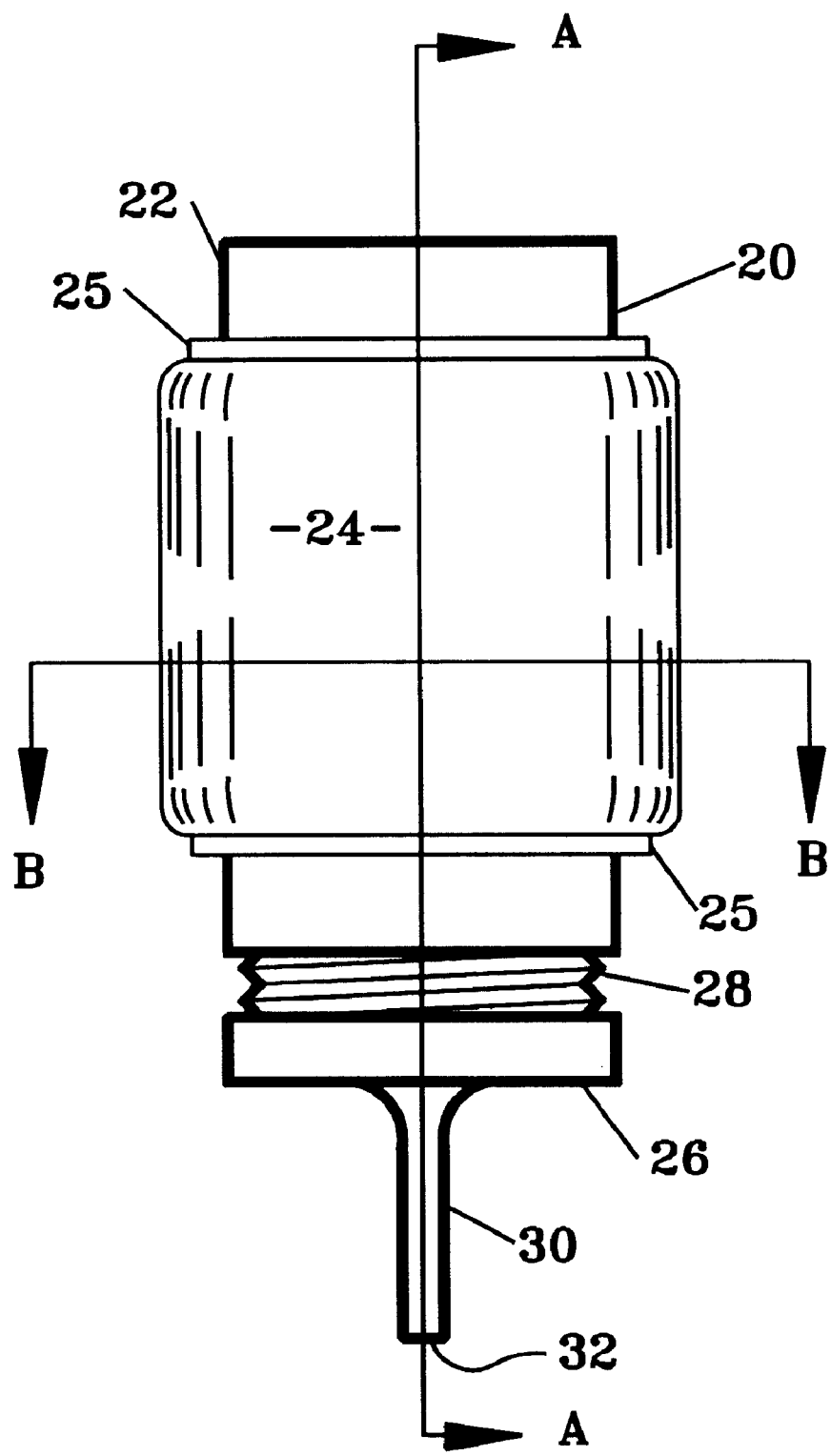
FIG. 1 is a side elevation of one version of the invention showing the flexible container, the external balloon, the cap and delivery nozzle.

FIG. 1 shows a side elevation of a preferred form of the smart scent delivery invention 20 in which a soft flexible polymeric container 22 is surrounded by a balloon-like inflatable structure 24. The container 22 has an opening provided with external male threads 28. A screw-on cap 26 is provided with internal female threads which match the male threads 28 formed into the opening end of container 22.

The cap 26 is constructed with a tubular nozzle 30 having a small bore conduit or channel 32 formed therethrough. The cap is formed with a flat or planar exterior to allow the container to rest on a support such as a hunting stand. No hanger is provided because experience and logic indicate that a swinging man-made device, though camouflaged, will spook the very animals the device is otherwise intended to attract.

The balloon is formed of two planar sheets of polymeric material fastened together at their edges to form seams 25. Further details of the balloon construction will be provided in connection with the discussion directed to FIGS. 2, 3, 6 and 7.

FIGS. 2A, 2B and FIG. 3 are cross-sectional views of the smart scent dispenser of FIG. 1. FIG. 2A shows the dispenser 20 and balloon 24 under cool conditions with balloon 24 in a low pressure condition. In this condition, most likely to arise at night or under cool rainy conditions, there is not sufficient internal pressure within balloon 24 to compress or deform the cylindrical side walls 23 of container 22.

Directing our attention now to the details of construction of the two side elevational views 2A and 2B, there is shown container 20 surrounded by balloon 24. Balloon 24 is filled with a gas 27. The balloon may be permanently filled by the manufacturer and sealed to prevent loss, or, as shown at 74 in FIGS. 6B and 6C a filling (and unfilling) valve is provided. This allows the balloon to be shipped unfilled and flat. Any, so called, "permanent" gasses such as air, nitrogen, oxygen, hydrogen or helium can be used to inflate the balloon. (Permanent gasses were those with very low boiling points, such as those named, which early researchers thought were incapable of liquefaction) All these "permanent" gasses exhibit substantially the same volume change per degree temperature change. Therefore, the balloon, inflated with any of these gasses, will give substantially identical performance whether it is inflated with pure helium or blown up by mouth with air, a mixture of oxygen and nitrogen. This provides a significant advantage over a pre-filled balloon since the device can be carried in a compact form to the hunting site and inflated there.

The container is partially or completely filled with the liquid scent material 38 with an air space 40 filling the remainder of the container 22, if the container is partly filled. The balloon is then fully or partly inflated, thereby providing one of several control means over the amount of liquid scent expelled which are provided by the invention and disclosed herein.

Referring now to FIGS. 6 as well as FIGS. 2, balloon 24 is formed from two planar layers of flexible polymer made in a rectangular format which are heat sealed at all the peripheral edges 25. The planar construction is best observed at FIGS. 6A, 6B and 6C. One end of the balloon is formed into an extended tab 42 on one side of which is provided one of a pair of a hook/loop fastener. In FIG. 6A tab 42 has pad 44L, the loop portion of the hook/loop pair. The mating hook portion of the pair 44H is fastened to the reverse side of the balloon portion, thereby providing adjustable means for securing the balloon around container 22. In use the planar balloon is wrapped around container 22 and the fastener faces 44H and L engaged.

The relative positioning of hook and loop fastener pads 44L and 44H can be offset. This provides for a loose or a snug fit between the balloon 24 and the container 22. The user is thereby provided with convenient means for providing adjustment over the rate and amount of liquid scent delivery to be provided with a given temperature change. A relatively loose fastening requires a larger temperature change to provide a given liquid scent flow. Such a condition arises when cool nights are to be followed by hot days. A snug engagement of the fasteners 44, achieved by wrapping the balloon tightly around container 22, requires a smaller temperature change to cause the gas or air 27 within balloon 24 to expand enough to compress container 22, thereby expelling relatively more of the scented liquid. Under each condition, cooling of the gas 27 within the balloon, arising at nightfall, causes the balloon 24 to shrink, thereby reducing the pressure within the container 22, allowing its sidewalls 23 to relax to their normal cylindrical condition and stopping the outflow of the liquid scent.

Referring again to FIGS. 2A and 2B, there is shown, in exaggerated form, in FIG. 2B, the result of increased temperature of the gas 27 within balloon 24. The increased temperature has caused the gas pressure within the balloon to increase, thereby deforming sidewall 23 of container 22 inward. The inward deformation causes increased pressure within container 22, thereby expelling some of its scented liquid contents 38 through small diameter tubular channel 32 formed within the nozzle 30. Typically the diameter of the tubular channel is in the range of 0.002 to 0.010 inches.

Since different liquid scents may have different viscosities, it is sometimes desirable to provide the tubular channel 32 with different resistances to flow. The inventor has achieved this effect by providing in FIG. 2C one or more wires 33 which are inserted into channel 32 to reduce its effective diameter and thereby provide a simple, yet externally adjustable flow limiting or adjusting apparatus. The wire 33 is bent or have one or more crimps to provide sufficient friction within the channel 32 to keep the wire 33 from falling out of channel 32 though other means to retain the wire 33 within channel 32 can be provided. Employing these means the desired volume of flow over the course of a day of about 2.5 milliliters can readily be achieved.

In FIG. 4 there is shown a cross-section of a cap with no delivery tube but with an adjustable outlet port. Flow cap 42 is made with internal threads to match container threads 28. Flow cap 42 is screwed tightly onto the container threads 28. Flow cap 42 also is provided with a tapered plug 50, fixedly attached to it. There is an outlet chamber 51 within adjustment cap 42 which receives liquid scent 38 from the bulk of liquid scent 38 stored in container 22 via one or more ports 52 provided in adjustment cap 42. Adjustment cap 46 screws onto threads 44 positioned at the end of flow cap 42. Adjustment cap 46 has port 48 positioned substantially centrally on its planar surface. When the adjustment cap 46 is screwed on tightly to threads 44, port 48 in adjustment cap 46 comes in secure contact with cone 50 and the outlet from container 22 is thereby closed. When the adjustment cap 46 is unscrewed slightly, an annular port is formed between port 48 and cone 50. The size of this annular port depends on how much adjustment cap 46 is unscrewed. This adjustability allows the user to compensate for varying liquid scent viscosities and varying conditions of use and also provides for integral means for securing positive closure of the container for traveling or storage.

FIG. 5 displays container 22 laying on the ground 54. In one version of the invention, container 22 is covered with earth 55 or alternately with small stones, leaves or other naturally occurring detritus to hide it. The outlet nozzle 30, with its channel 32, is positioned off-center so that the container 22 with attached cap can be positioned with the flow channel 32 nearest the ground on which it rests so that all or substantially all the liquid scent can be squeezed out by the expansion of balloon 27 through channel 32. If desired a tubular extension 60 can be provided to position the point of dispersal of the liquid scent where desired, without risk of dispersal by the wind or evaporation and loss prior to reaching the ground.

FIGS. 7A, 7B and 7C illustrate another version of the invention wherein container 93 has a cap 80 with no opening in it at all. The end of container opposite cap 80 is provided with an outlet nozzle 30 containing channel 32, all as otherwise described above in connection with FIGS. 1, 2 and 5 except that the nozzle 30 and its flow channel 32 are integral with container 22. In an alternate construction, the outlet nozzle 30 and channel 32A may be positioned off center as shown in FIG. 7C.

In FIGS. 7 there is shown a segmented balloon 90 having a series of parallel tubular elements 94 each connected to the other by webs 96. However, webs 94 do not extend the full distance between edge welds 25, thereby providing intercommunication between the tube volumes and allowing all the tubes 94 to be inflated from one filling point. A tab 42 and hook and loop fasteners 43/44 are provided to allow the balloon to be secured around a container with the desired degree of tightness.

In an alternate construction, container threads 86 and cap 80 may be eliminated entirely. With this construction, the container having no opening other than channel 32 may be filled either by a hypodermic needle or by squeezing and releasing the sides of flexible container 92 with the end of the nozzle 30 immersed in the liquid scent.

FIGS. 8A and 8B illustrate an optional construction for an outlet for container 100. Here a boss 102 is formed in the container which allows a slightly oversized tube 104 to be inserted, thereby providing a leak-fee connection to the interior of container 100. In an alternate construction a hard rigid tube 108 having a sharpened end may be employed to penetrate the container wall to provide an outlet nozzle at any desired position.

From the foregoing description, it can be seen that the present invention comprises an improved dispenser for a scented liquid. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims and reasonable equivalents of each and every claimed element and function.

I claim:

1. A device for holding and dispensing a scented liquid on a temperature rise, said device comprising:

container means for holding and liquid outlet means for dispensing the liquid, the container means having a flexible wall;

balloon-like gas-containing means positioned in operative relation to the wall for pressing on the wall with a greater force on a temperature rise and for pressing on the wall with a lesser force on a temperature drop, whereby liquid is dispensed from the outlet means on a temperature rise.

2. A device as recited in claim 1 where the container means includes a cylindrical flexible wall and the balloon-like means is positioned external the container to contact a portion of the wall.

3. A device as recited in claim 2 where the balloon-like means includes at least two sealed-together elements.

4. A device as recited in claim 3 where the balloon-like means includes a first substantially planar element having a first thickness and a second substantially planar element having a second thickness and the elements are peripherally sealed together.

5. A device as recited in claim 4 where the first thickness is greater than the second thickness.

6. A device as recited in claim 3 further providing that the sealed-together elements are further formed into interconnected substantially parallel adjoining chambers where the elements between the chambers are partially joined together thereby providing means for facilitating wrapping the balloon-like structure around the flexible cylindrical wall for contacting it.

7. A device as recited in claim 3 further providing means for securing the balloon-like means in operative relation to the container.

8. A device as recited in claim 7 where the securing means includes a hook-loop fastener.

9. A device as recited in claim 2 further providing the container includes an opening having cap means for closing the opening, the cap means having a center and an edge.

10. A device as provided in claim 9 where the cap means includes the liquid outlet means for dispensing the liquid.

11. A device as recited in claim 10 where the liquid outlet means is formed nearer the center of the cap means.

12. A device as recited in claim 11 where the liquid outlet means is formed nearer the edge of the cap means.

13. A device as recited in claim 2 further providing that the container means includes at least one substantially planar end adjoining the cylindrical wall and the liquid outlet means in positioned in the end.

14. A device as recited in claim 13 where the liquid outlet means is positioned nearer the junction of the end and the cylindrical flexible wall.

15. A device as recited in claim 2 further providing that the liquid outlet means includes a tube having an inside diameter and wire means for insertion into the tube for reducing the effective inside diameter and thereby varying the flow capacity thereof.

16. A method of dispensing scented liquid comprising the steps of:

providing container means for holding the liquid and outlet means for dispensing the liquid, the container means having a flexible wall and balloon-like gas-containing means positioned in operative relation to the wall for pressing on the wall with a greater force on a temperature rise and for pressing on the wall with a lesser force on a temperature drop, whereby on a temperature rise liquid is dispensed from the container means through the liquid outlet means, the outlet means having an inlet and an outlet.

17. A method as recited in claim 16 further providing the step of:

positioning the container means at ground level with the outlet of the dispensing means positioned at a desired location.

18. A method as recited in claim 17 further providing that the container means includes a cylindrical flexible wall and the balloon-like means is positioned external the container to contact a portion of the wall.

19. A method as recited in claim 18, where the balloon-like means includes at least two sealed-together elements.

20. A method as recited in claim 19 further providing that the balloon-like means includes a first substantially planar element having a first thickness and a second substantially planar element having a second thickness and the elements are peripherally sealed together.

* * * * *